UNITED STATES PATENT OFFICE.

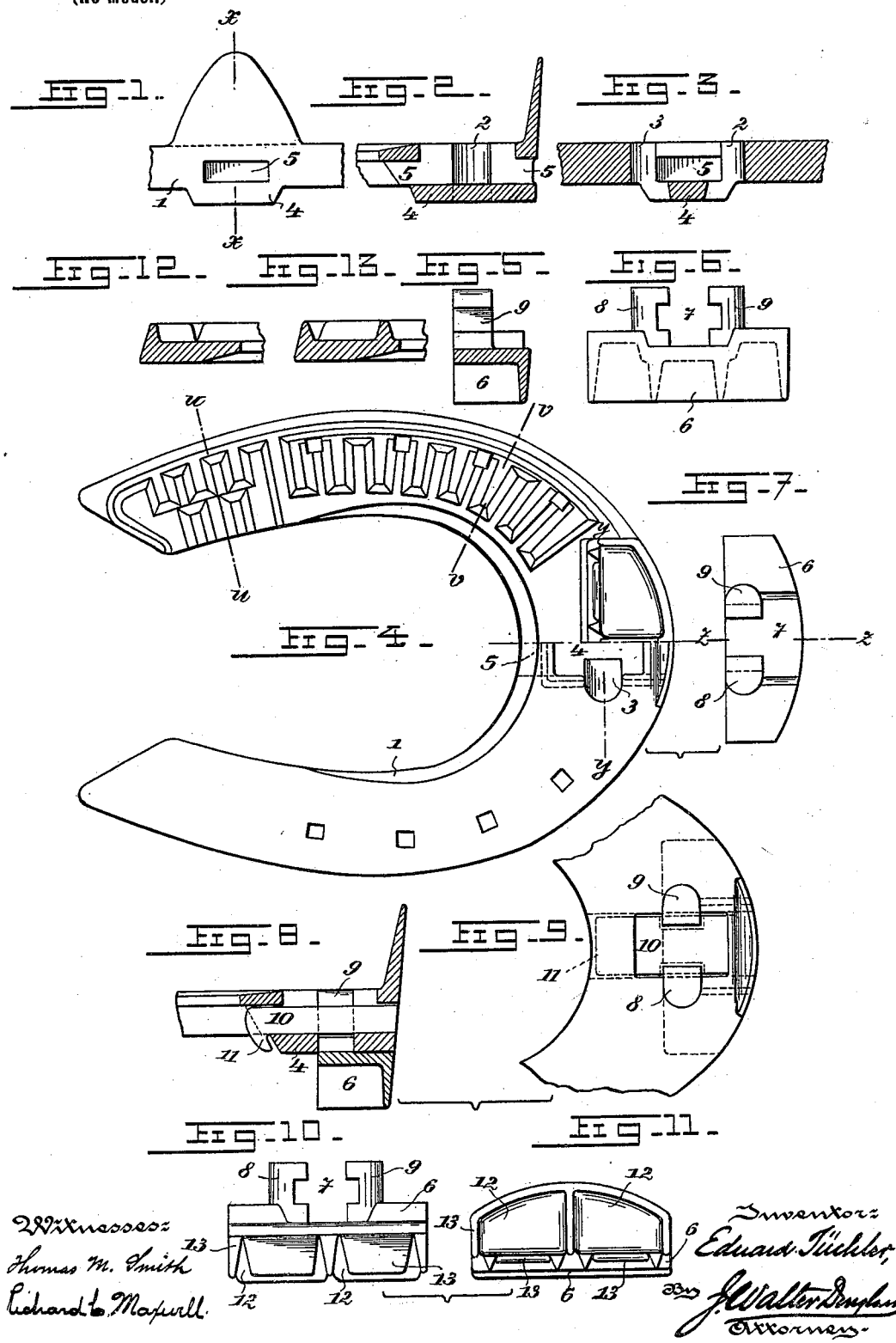

EDUARD TÜCHLER, OF VIENNA, AUSTRIA-HUNGARY.

HORSESHOE.

SPECIFICATION forming part of Letters Patent No. 645,580, dated March 20, 1900.

Application filed December 9, 1899. Serial No. 739,761. (No model.)

*To all whom it may concern:*

Be it known that I, EDUARD TÜCHLER, blacksmith, of 56 Staudgasse, Vienna, in the Empire of Austria-Hungary, have invented Improvements Relating to Horseshoes and to Calks Therefor, of which the following is a full, clear, and exact description.

This invention relates to horseshoes and to calks therefor, and more particularly to the connection of the calk or grip to the horseshoe, which differs from other existing constructions in the manner in which the calk or grip is securely mounted in position and can nevertheless be detached with very little trouble.

Another feature of my invention is to provide a horseshoe on the tread thereof with a number of teeth, ribs, or sharp projections for the purpose of preventing the horse from slipping.

To facilitate comprehension, I have illustrated my said invention in the accompanying drawings, in which—

Figure 1 is a front view of a horseshoe. Fig. 2 is a section on line $xx$, Fig. 1. Fig. 3 is a section on line $yy$, Fig. 4. Fig. 4 illustrates a plan view of the horseshoe, showing partly the upper side and partly the under side of the horseshoe. Fig. 5 shows a calk or grip in a section on line $zz$, Fig. 7. Fig. 6 is a front elevation of the calk. Fig. 7 is a plan view of Fig. 5. Fig. 8 illustrates a section of the horseshoe connected with the calk. Fig. 9 is a plan view thereof. Figs. 10 and 11 show a calk with balls of india-rubber inserted therein. Figs. 12 and 13 are sections taken respectively on lines $uu$ and $vv$ of Fig. 4.

The easily-detachable connection of the calk or grip to the horseshoe is effected by providing the said calk with one or more pins or projections which are introduced into suitable holes or sockets in the horseshoe, where they are secured by keys or wedges. The horseshoe may also be provided with ribs, teeth-cones, prisms, or the like, tapering toward their extremities. By this arrangement the dirt from the street will be compressed into the interstitial spaces between the ribs, &c. The sharp edges, however, cut through the dirt and enable the horse to obtain a firm foothold on asphalted streets, and by reason of the plurality of points of contact the danger of slipping is reduced to a minimum.

In carrying my said invention into practice I preferably proceed as follows: The horseshoe 1 is provided with two transverse holes or apertures 2 and 3, extending through the entire height of the shoe, these holes being preferably of half-round form. On the under side the horseshoe is provided with a projecting plate 4, which is made of I form in order to leave the said transverse holes or apertures free. On the front of the horseshoe there is an aperture 5, which extends through the whole width of the bar for a purpose to be hereinafter mentioned. The calk 6, which corresponds in form to the said plate 4, is provided with a depression or recess 7, and with two pins or projections 8 9, which are made with lateral slots, so as to form hooks, and fit into the said transverse holes or apertures 2 and 3. In order to connect the calk to the horseshoe, the said pins 8 and 9 are inserted from beneath into the said transverse apertures 2 and 3, Figs. 8 and 9, and are drawn up by means of a key or wedge 10, which is inserted into the front aperture 5 and is provided with a head or flange 11 at the rear. The said key bears on one side against the said plate 4, and on the other side engages with the hooks of the calk, and thus insures the latter being securely held in position.

The pins 8 and 9 can be arranged horizontally on the calk or grip, in which case the holes or apertures 2 3 in the horseshoe are also horizontal—that is to say, they must extend in the direction of the breadth of the bar. In this case the key or wedge is preferably first inserted behind the horseshoe into one or both pins without passing through the same.

The calk or grip itself can either be sharp-edged or flat. It can also be made in the form of a prism, open at the bottom, the edges of which are cut away, so that the side walls 13 extend straight downward and form a space for the reception of india-rubber balls 12, Figs. 10 and 11. In this manner it is possible to fit one or more solid pieces of india-rubber into the calk or grip, which pieces extend beyond the side walls 13, and thus prevent slipping of the horse. In order to hold the india-rubber fast, the side walls are preferably bent inward after the india-rubber is placed in position.

The tread of the horseshoe may be provided with ribs, teeth, prisms, or the like, tapering toward their extremities, which is to be seen on the upper half of Fig. 4 and the sections thereof in Figs. 12 and 13. This arrangement makes the horseshoes comparatively light, and they do not fatigue the horses as do the shoes at present in use. Moreover, the horses are protected from shock, and inflammation of the hoof is entirely avoided.

Having thus described the nature and object of my invention, what I claim as new, and desire to secure by Letters Patent, is—

The combination with a horseshoe provided with two apertures extending vertically through the shoe and an aperture extending horizontally through the same, a plate of substantially I form located on the under side of the horseshoe adjacent to the vertical and horizontal apertures, a removable calk or grip provided with pins or projections of substantially hook shape adapted to enter the vertical apertures in the shoe, and a key or wedge adapted to enter the horizontal aperture of the shoe and to rest between the hooks of the calk-pins and the I-plate of the shoe, substantially as and for the purposes described.

In testimony whereof I have hereunto set my hand in presence of two subscribing witnesses.

EDUARD TÜCHLER.

Witnesses:
ALVESTO S. HOGUE,
AUGUST FRUGGER.